(12) United States Patent
Gor et al.

(10) Patent No.: US 9,397,337 B2
(45) Date of Patent: Jul. 19, 2016

(54) POLYURETHANE-BASED ELECTRODE BINDER COMPOSITIONS AND ELECTRODES THEREOF FOR ELECTROCHEMICAL CELLS

(71) Applicant: Lubrizol Advanced Materials, Inc., Cleveland, OH (US)

(72) Inventors: Tesham Gor, Brecksville, OH (US); Qiwei Lu, Seven Hills, OH (US); Feina Cao, Canton, MI (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 152 days.

(21) Appl. No.: 14/354,214

(22) PCT Filed: Oct. 24, 2012

(86) PCT No.: PCT/US2012/061529
§ 371 (c)(1),
(2) Date: Apr. 25, 2014

(87) PCT Pub. No.: WO2013/062997
PCT Pub. Date: May 2, 2013

(65) Prior Publication Data
US 2014/0302398 A1 Oct. 9, 2014

Related U.S. Application Data

(60) Provisional application No. 61/552,552, filed on Oct. 28, 2011.

(51) Int. Cl.
| | | |
|---|---|---|
| *H01M 4/62* | (2006.01) | |
| *H01M 4/58* | (2010.01) | |
| *H01M 4/131* | (2010.01) | |
| *H01M 10/052* | (2010.01) | |

(52) U.S. Cl.
CPC ............ *H01M 4/622* (2013.01); *H01M 4/5825* (2013.01); *H01M 4/625* (2013.01); *H01M 4/626* (2013.01); *H01M 4/131* (2013.01); *H01M 10/052* (2013.01)

(58) Field of Classification Search
None
See application file for complete search history.

(56) References Cited

U.S. PATENT DOCUMENTS

| | | |
|---|---|---|
| 4,844,995 A | 7/1989 | Noda et al. |
| 5,019,467 A | 5/1991 | Fujiwara |
| 5,110,694 A | 5/1992 | Nagasubramanian et al. |
| 5,346,788 A | 9/1994 | Chang et al. |
| 5,558,959 A | 9/1996 | Venugopal et al. |
| 5,597,661 A | 1/1997 | Takeuchi et al. |
| 5,620,811 A | 4/1997 | Zhang et al. |
| 6,210,513 B1 | 4/2001 | Hirata et al. |
| 6,475,663 B1 | 11/2002 | Mohwald et al. |
| 6,866,965 B2 | 3/2005 | Lee |
| 6,949,285 B1 | 9/2005 | Tobinaga et al. |
| 6,991,874 B1 | 1/2006 | Mohwald et al. |
| 7,160,949 B2 | 1/2007 | Ota et al. |
| 7,960,056 B2 | 6/2011 | Yang et al. |
| 8,053,113 B2 | 11/2011 | Oh et al. |
| 2001/0010252 A1 | 8/2001 | Hirata et al. |
| 2002/0042001 A1 | 4/2002 | Lee |
| 2002/0061449 A1 | 5/2002 | Maruo et al. |
| 2003/0059681 A1 | 3/2003 | Noh |
| 2003/0091904 A1 | 5/2003 | Munshi |
| 2004/0234865 A1 | 11/2004 | Sato et al. |
| 2010/0047693 A1 | 2/2010 | Yang et al. |
| 2011/0092648 A1 | 4/2011 | Lu et al. |
| 2011/0117454 A1 | 5/2011 | Winther-Jensen et al. |
| 2011/0135988 A1 | 6/2011 | Noumi et al. |
| 2011/0135989 A1 | 6/2011 | Noumi et al. |
| 2011/0165449 A1 | 7/2011 | Take et al. |
| 2011/0168043 A1 | 7/2011 | Meltzer et al. |

*Primary Examiner* — Sarah A Slifka
(74) *Attorney, Agent, or Firm* — Eryn Ace Fuhrer, Esq.; Teresan W. Gilbert, Esq.

(57) ABSTRACT

The invention relates to an electrode binder composition, an electrode made using the described binder composition, and an electrochemical cell made using the described electrode, where the all of these materials are made using a composition of a poly(dialkylene ester) thermoplastic polyurethane composition. The electrode is made using the described thermoplastic polyurethane and an electrode active material. The electrochemical cells can be made using the described electrodes and also using (i) membranes and/or separators made using the described poly(dialkylene ester) thermoplastic polyurethane composition; (ii) an electrolyte system based on the described poly(dialkylene ester) thermoplastic polyurethane composition; or (iii) a combination thereof.

19 Claims, No Drawings

POLYURETHANE-BASED ELECTRODE BINDER COMPOSITIONS AND ELECTRODES THEREOF FOR ELECTROCHEMICAL CELLS

BACKGROUND OF THE INVENTION

The invention relates to an electrode binder composition, an electrode made using the described binder composition, and an electrochemical cell made using the described electrode, where the all of these materials are made using a composition of a poly(dialkylene ester) thermoplastic polyurethane composition. The electrode is made using the described thermoplastic polyurethane and an electrode active material. The electrochemical cells can be made using the described electrodes and also using (i) membranes and/or separators made using the described poly(dialkylene ester) thermoplastic polyurethane composition; (ii) an electrolyte system based on the described poly(dialkylene ester) thermoplastic polyurethane composition; or (iii) a combination thereof.

With the increasing supply of portable electronic devices, such as PDAs, mobile phones and laptop computers, their use range has been widened. Accordingly, the requirement for more compact, thinner, and lightweight batteries with high performance as power sources has been increasing, and much research on batteries has been conducted. Since lithium batteries are lightweight and have higher energy density, they have been used as major power sources for such portable devices. There is a need to improve the overall performance of electrochemical cells and so there is a need to improve the components that make up the electrochemical cells.

Cathode active materials for lithium batteries may include Li-containing transition metal oxides, such as $LiCoO_2$, $LiNiO_2$, $LiMn_2O_4$, $LiFePO_4$, and chalcogen compounds, such as $MoS_2$. Since these compounds have layer-crystalline structures, Li ions can be reversibly intercalated or deintercalated. Accordingly, these compounds have been widely utilized as cathode active materials for lithium batteries.

Metal lithium can be used as an anode active material. However, lithium ions of lithium are intercalated and deintercalated. Then, needle-shaped lithium dendrites grow on the surface of lithium because the lithium repeatedly dissolves and precipitates during charging/discharging of the battery. The needle-shaped dendrites have lower charge/discharge efficiency and can cause internal short-circuits by contacting a cathode. In addition, lithium metal can be very unstable in these applications due to its reactivity with oxygen and moisture.

To solve these problems, use of lithium alloy, metal powder, graphitic or carbonaceous materials, metal oxides, or metal sulfides, which can reversibly intercalates and deintercalates Li ions, as an anode material is under consideration. However, when a sheet-type anode made of a lithium alloy is used in a battery, the sheet-type alloy becomes thinner during charging/discharging, thereby degrading a current collecting property. Thus, the charge/discharge characteristics deteriorate.

When a sheet-type electrode is made of metal powder, a carbonaceous material, metal oxide, or metal sulfide powder, a binder is further used because these materials alone in powder form cannot form electrodes. For example, when manufacturing an anode using a carbonaceous material, it is common to add an elastic rubber-based polymer material as a binder.

When manufacturing an anode using metal oxides or metal sulfides, a conducting agent, in addition to the binder, is added to improve the charge/discharge characteristics. In general, when manufacturing an anode using a carbonaceous material, the carbonaceous material is pulverized into powder and a binder is added. However, if a conventional rubber-based polymer material is utilized as a binder, graphite particles may be coated depending on the amount of the binder, thereby hindering intercalation and deintercalation of lithium ions and deteriorating the high efficiency discharge characteristics.

If a conventional binder is used alone, regardless of the kind and form of a carbonaceous material, a large amount of binder should be added because a binding force between a metallic core material and the conventional binder is weak. However, when a large amount of binder is added to enhance the binding force, the surface of a carbonaceous material is coated by the binder. Therefore, the high efficiency discharge characteristics deteriorate. On the contrary, if a small amount of binder is used to maintain the discharge characteristics, the sheet-type electrode cannot be easily manufactured because a material for an electrode plate separates from the core material. Furthermore, the failure ratio increases in the manufacture of electrode plates.

Therefore, there is a need for binders that can be used in electrode such that the resulting electrodes perform at least as well as conventional electrodes and that address one or more of the problems described herein. In other words, there is a need for improved electrode binders, electrodes made from such binders, and electrochemical cells that use one or more such electrodes that address the problems seen in the current alternatives.

SUMMARY OF THE INVENTION

The invention relates to an electrode binder composition made with a poly(dialkylene ester) thermoplastic polyurethane composition and optionally further comprising a conducting agent, an organic solvent, or a combination thereof. The invention also includes the use of the described poly(dialkylene ester) thermoplastic polyurethane composition to prepare electrode binder compositions and the resulting electrodes made therefrom.

The invention also provides an electrochemical cell electrode comprising: (A) an electrode binder composition comprising a poly(dialkylene ester) thermoplastic polyurethane composition, and (B) an electrode active material, and wherein the electrode optionally further comprises a conducting agent, an organic solvent, or a combination thereof. The electrode can be a sheet-type electrode for an electrochemical, for example, a lithium battery.

The invention further relates to an electrochemical cell comprising at least one electrode where the electrode comprises: (A) an electrode binder composition comprising a poly(dialkylene ester) thermoplastic polyurethane composition, and (B) an electrode active material, and wherein the electrode optionally further comprises a conducting agent, an organic solvent, or a combination thereof.

The invention further provides for such electrochemical cells where: (i) the membranes and/or separators of the cells made using the described poly(dialkylene ester) thermoplastic polyurethane composition; (ii) the electrolyte system of the cells include an electrolyte active species dispersed in a polymeric support structure made using the described poly(dialkylene ester) thermoplastic polyurethane composition; or (iii) a combination thereof.

The invention provides an electrode binder compositions, electrodes made therefrom, and electrochemical cells made therefrom using (A) a poly(dialkylene ester) thermoplastic polyurethane composition. The electrodes may further include (B) an electrode active material. The electrode can further include a conducting agent, such as carbon black or nickel powder. These conducting agents may be referred to as cathode or anode powders. The electrode may also further include an optional organic solvent, for example: dimethylformamide (DMF); dimethylsulfoxide (DMSO); dimethylacetamide (DMA); acetone; N-methyl-2-pyrrolidone; and a combination thereof. In some embodiments, no solvent is used or the solvent is removed during the preparation of the electrode.

The poly(dialkylene ester) thermoplastic polyurethane composition is made by reacting (i) at least one poly(dialkylene ester)polyol intermediate with (ii) at least one diisocyanate and (iii) at least one chain extender; wherein (i), the poly(dialkylene ester)polyol intermediate, comprises an intermediate derived from at least one dialkylene glycol and at least one di-carboxylic acid, or an ester or anhydride thereof.

The invention also provides an electrochemical cell comprising at least one electrode comprising: a composition of (A) a poly(dialkylene ester) thermoplastic polyurethane composition and (B) an electrode active material. The electrochemical cell can further include: (I) a separator membrane disposed between said positive and negative electrodes, wherein the said membrane comprises (A) a poly(dialkylene ester) thermoplastic polyurethane composition; (II) a polymer gel electrolyte disposed between said positive and negative electrodes, wherein the polymer electrolyte comprises (A) a poly(dialkylene ester) thermoplastic polyurethane composition, (B) an alkali metal salt; and (C) an aprotic organic solvent.

The membrane can comprise the poly(dialkylene ester) thermoplastic polyurethane composition described herein. The electrolyte system for use in an electrochemical cell having positive and negative electrodes, said electrolyte system comprising: (A) a polymeric support structure fabricated of a poly(dialkylene ester) thermoplastic polyurethane composition, (B) an alkali metal salt; and (C) an aprotic organic solvent.

In any of these embodiments, the invention provides for a poly(dialkylene ester) thermoplastic polyurethane made by reacting (i) at least one poly(dialkylene ester)polyol intermediate with (ii) at least one diisocyanate and (iii) at least one chain extender; wherein (i), the poly(dialkylene ester)polyol intermediate, comprises an intermediate derived from at least one dialkylene glycol and at least one di-carboxylic acid, or an ester or anhydride thereof. In some embodiments, component (iii) the chain extender comprises hydroquinone bis (beta-hydroxyethyl)ether. In some of these embodiments, component (iii) is essentially free or, or even free of, ethylene glycol, butanediol, and/or small diamines.

The invention also provides an electrochemical cell comprising a positive electrode, a negative electrode, and (I) a separator membrane disposed between said positive and negative electrodes, wherein the said membrane comprises (A) the described poly(dialkylene ester) thermoplastic polyurethane composition; (II) a polymer gel electrolyte disposed between said positive and negative electrodes, wherein the polymer electrolyte comprises (A) the described poly(dialkylene ester) thermoplastic polyurethane composition, (B) an alkali metal salt, and (C) an aprotic organic solvent; or (III) both (I) and (II), In some embodiments, the electrochemical cell has at least one of the following characteristics: (i) a charge/discharge cycle life of >500, >750 or even >1000; (ii) a charge/discharge efficiency of >90% or even >95% after 500 cycles; (iii) an operation window of −10 to 70° C.; (iv) is essentially free of any rigid metallic casing; and/or (v) is a pouch type battery.

DETAILED DESCRIPTION OF THE INVENTION

Various features and embodiments of the invention will be described below by way of non-limiting illustration.

The present invention relates to composition comprising at least one thermoplastic polyurethane elastomer, more specifically a poly(dialkylene ester) thermoplastic polyurethane, where the composition is used in the preparation of an electrode for an electrochemical cell, and so the electrodes themselves and the electrochemical cells that utilizes the described electrodes.

The Binder Composition

The present invention relates to a binder composition comprising at least one thermoplastic polyurethane elastomer, more specifically a poly(dialkylene ester) thermoplastic polyurethane, where the composition is used in the preparation of an electrode for an electrochemical cell, or an electrochemical cell that utilizes the described electrodes.

The binder composition may optionally further include a conducting agent. The binder composition may optionally further include an organic solvent. The binder composition may optionally further include a conducting agent and an organic solvent.

Suitable conducting agents include carbon-based conducting fillers, nickel powder, or a combination thereof. Examples of carbon-based conducting fillers include carbon black, nano carbon fibers, carbon nano tubes, grapheme, or combinations thereof.

Suitable organic solvents include dimethylformamide (DMF); dimethylsulfoxide (DMSO); dimethylacetamide (DMA); acetone; N-methyl-2-pyrrolidone; and a combination thereof.

Suitable poly(dialkylene ester) thermoplastic polyurethane compositions useful in the binder compositions of the invention include any of the polyurethanes described herein. In some embodiments, the polyurethane is made by reacting (i) at least one poly(dialkylene ester)polyol intermediate with (ii) at least one diisocyanate and (iii) at least one chain extender. The poly(dialkylene ester)polyol intermediate can be an intermediate derived from at least one dialkylene glycol and at least one di-carboxylic acid, or an ester or anhydride thereof.

The invention further provides for the use of the described thermoplastic polyurethane compositions, or the binder compositions that include the same, in the preparation of the electrodes, and in some embodiment, in the preparation of the electrodes for lithium ion batteries.

The Electrode

The invention provides an electrochemical cell electrode comprising: a composition of (A) a poly(dialkylene ester) thermoplastic polyurethane composition and (B) an electrode active material. In some embodiments, the invention provides an electrochemical cell electrode comprising: an electrode binder composition, which itself comprises a composition of (A) a poly(dialkylene ester) thermoplastic polyurethane composition; and (B) an electrode active material. Any of the binder compositions described above can be used to prepare the described electrodes.

The electrode may be for a lithium battery where the electrode contains a poly(dialkylene ester) thermoplastic polyurethane composition and a cathode active material or an anode active material, both of which may be referred to as an electrode active material. The electrode may further include a conducting agent, an organic solvent, or both.

The invention also provides a method of fabricating an electrode, the method including: forming an active material solution by mixing an electrode active material, a conducting agent, a poly(dialkylene ester) thermoplastic polyurethane composition and an organic solvent; coating a surface of an electrode plate with the active material solution and drying the coated surface; and pressurizing and drying the electrode plate (i.e., the cathode plate or the anode plate) in a vacuum under pressure.

Poly(dialkylene ester) thermoplastic polyurethane compositions suitable for use in the present invention are described in detail below.

Any conventional organic solvent that is used in common batteries can be used in the present invention without particular limitation. However, the organic solvent may be a compound having relatively strong dipole moments. Examples of the compound include dimethylformamide (DMF), dimethylsulfoxide (DMSO), dimethylacetamide (DMA), acetone, and N-methyl-2-pyrrolidone (hereinafter referred as NMP). In some embodiments, the solvent is NMP. The ratio of thermoplastic polyurethane compositions to the organic solvent may be 1:0.1 through 100 (by weight). If the ratio of the organic solvent is less than 0.1, the thermoplastic polyurethane compositions may not fully dissolve and cannot act as a binder. If the ratio of the organic solvent exceeds 100, the thermoplastic polyurethane compositions dissolves well, but a concentration of the active material solution may be too low, which may causing problems in the coating process.

In some embodiments, the thermoplastic polyurethane compositions of the invention may be used as a top coating layer on an electrode. In such embodiments, the electrode may be any conventional electrode, or current collector suitable for use in an electrode, that is then coated with the described thermoplastic polyurethane compositions.

When an anode surface or a cathode surface is coated with the thermoplastic polyurethane compositions, the coating speed may be important. In some embodiments, the coating speed may be in the range of 10-30 m/min. If the coating speed is less than 10 m/min, it can sometimes take more time to manufacture electrodes. If the coating speed exceeds 30 m/min, drying may have to be performed at a high temperature for a short time. Therefore, if a battery contains the electrode coated at such a high speed, the charge/discharge efficiency and lifespan efficiency may be degraded.

In some embodiments, a pressurizing process may also be carried out after the cathode surface or the anode surface is coated with the active material solution. Through the pressurizing process, the filling ratio of the active material and the electrode binder in the electrode can sometimes be increased, and electrical contact can sometimes be improved. In some embodiments, the pressurizing process may be performed at a pressure of 1 to 1,000 $kg/cm^{-3}$. If the pressure is less than 1 $kg/cm^{-3}$, the filling ratio and the electrical contact may in some cases decrease. If the pressure exceeds 1,000 $kg/cm^{-3}$, the active material and a current collector can in some cases be destroyed.

In some embodiments, the drying temperature in the coating process may also affect the crystalline phase composition of the thermoplastic polyurethane compositions. If the drying temperature is too high, a large amount of disfavored crystalline phases can in some cases be created. Therefore, in some embodiments, the drying temperature may be kept in the range of 80 to 120° C.

Any cathode surface that is commonly used in the art is useful in the present invention without particular limitation. The cathode surface is a chemically non-reactive electrical conducting agent such as, preferably, aluminum foil. Examples of the cathode active material, with which the cathode surface is coated, include at least one of lithium composite oxide, elemental sulfur, casolite in which $Li_2S_n$, where n is greater than or equal to 1 is dissolved, organosulfur and $(C_2S_x)_y$, where x is from 2.5 to 20 and y is greater than or equal to 2. In the present invention, the amount of the cathode active material is in the range of from 80 or 90 up to 99% by weight with respect to the entire cathode composition. If the amount is less than 80% or 90% by weight, the battery performance becomes poor due to the lack of the active material. The amount exceeds 99% by weight, the dispersibility and binding force of the active material decreases.

Any anode surface that is a chemically non-reactive electrical conducting agent commonly used in the art can be used in the present invention without particular limitation. Examples of the anode surface include stainless steel, nickel, Cu, and titanium. Here, the surfaces of the stainless steel or Cu may be coated with C, Ni, Ti or Ag. In some embodiments, the anode surface is composed of Cu or a Cu alloy.

Any anode active material commonly used in the art to coat the anode surface can be used in the present invention without particular limitation. The anode active material may be a graphite-based material, such as natural graphite, artificial graphite, coke, and carbon fiber; a compound containing at least one element such as Al, Si, Sn, Ag, Bi, Mg, Zn, In, Ge, Pb, and Ti, which can alloy with Li; a composite composed of the compound containing at least one element which can alloy with Li, the graphite-based material, and carbon; or a lithium-containing nitride. The anode active material plays a key role in the battery performance. A larger amount of the anode active material generally results in better battery performance. In the present invention, the amount of the anode active material may be in the range of 90-99% by weight with respect to the entire anode composition. If the amount of the anode active material is less than 90% by weight, the battery performance may deteriorate due to the lack of the anode active material. If the amount of the anode active material exceeds 99% by weight, the dispersibility and binding force of the anode active material may decrease.

Any conducting agent that is commonly used in the art can be used in the present invention without particular limitation. Examples of the conducting agent include carbon black and nickel powder. The amount of the conducting agent may be in the range of 0-10% by weight, preferably 1-8% by weight, based on the electrode composition.

The electrode of the invention may be sheet-type electrodes. The cathodes and anodes described herein, which contain the thermoplastic polyurethane compositions according to the present invention, can be used to manufacture an electrochemical cell such as a lithium battery.

The Thermoplastic Polyurethane Compositions

The thermoplastic polyurethane compositions of the present invention are poly(dialkylene ester) thermoplastic polyurethane compositions. The poly(dialkylene ester) thermoplastic polyurethane is made by reacting (i) at least one poly(dialkylene ester)polyol intermediate with (ii) at least one diisocyanate and (iii) at least one chain extender.

The poly(dialkylene ester)polyol intermediate is derived from at least one dialkylene glycol and at least one di-carboxylic acid, or an ester or anhydride thereof. However, other polyol intermediates may also be present and used in combination with the poly(dialkylene ester)polyol intermediate described herein.

The di-carboxylic acid described above may contain from 4 to 15 carbon atoms. Suitable examples of the di-carboxylic acid include succinic acid, glutaric acid, adipic acid, pimelic acid, suberic acid, azelaic acid, sebacic acid, dodecanedioic acid, isophthalic acid, terephthalic acid, cyclohexane dicarboxylic acid, or combinations thereof. In some embodiments, the di-carboxylic acid is adipic acid.

The dialkylene glycol described above may contain from 2 to 8 carbon atoms, and in some embodiments 2 to 8 aliphatic carbon atoms (still allowing for the presence of aromatic carbon atoms). Suitable examples of the dialkylene glycol include oxydimethanol, diethylene glycol, dipropylene glycol, 3,3-oxydipropan-1-ol, dibutylene glycol, or combinations thereof. In some embodiments, the dialkylene glycol is diethylene glycol.

In some embodiments, the poly(dialkylene ester)polyol intermediate is derived from adipic acid and diethylene glycol, and has a number average molecular weight of from 1000 to 4000, or from 1500 to 3500, or even from 2000 to 3000. In some embodiments, the poly(dialkylene ester)polyol intermediate is used in combination with a second polyol comprising a poly(mono-alkylene ester), for example, a polyester polyol derived from butanediol and adipic acid, where the resulting polyol may have a number average molecular weight of from 100 to 4000, or from 1500 to 3500, or even from 2000 or 2100 to 3000.

As noted above, the poly(dialkylene ester) thermoplastic polyurethane is made by reacting (i) at least one poly(dialkylene ester)polyol intermediate with (ii) at least one diisocyanate and (iii) at least one chain extender.

The poly(dialkylene ester)polyol intermediate may be used in combination with one or more additional polyols. Suitable poly(dialkylene ester)polyol intermediates for use in this invention may be derived from at least one dialkylene glycol and at least one dicarboxylic acid, or an ester or anhydride thereof. The poly(dialkylene ester)polyol intermediates of the present invention may include at least one terminal hydroxyl group, and in some embodiments, at least one terminal hydroxyl group and one or more carboxylic acid groups. In another embodiment, the poly(dialkylene ester)polyol intermediates include two terminal hydroxyl groups, and in some embodiments, two hydroxyl groups and one or more, or two, carboxylic acid groups. The poly(dialkylene ester)polyol intermediates are generally a substantially linear, or linear, polyester having a number average molecular weight (Mn) of from about 500 to about 10,000, about 500 to about 5000, or from about 1000 to about 3000, or about 2000.

In some embodiments, the poly(dialkylene ester)polyol intermediate may have a low acid number, such as less than 1.5, less than 1.0, or even less than 0.8. A low acid number for the poly(dialkylene ester)polyol intermediate may generally provide improved hydrolytic stability in the resulting TPU polymer. The acid number may be determined by ASTM D-4662 and is defined as the quantity of base, expressed in milligrams of potassium hydroxide that is required to titrate acidic constituents in 1.0 gram of sample. Hydrolytic stability can also be improved by adding hydrolytic stabilizers to the TPU which are known to those skilled in the art of formulating TPU polymers.

Dialkylene glycols suitable for use in preparing the poly(dialkylene ester)polyol intermediate of the present invention may be aliphatic, cyclo-aliphatic, aromatic, or combinations thereof. Suitable glycols may contain from 2 or 4 or 6 to 20, 14, 8, 6 or 4 carbon atoms, and in some embodiments may contain 2 to 12, 2 to 8 or 6, 4 to 6, or even 4 carbon atoms. In some embodiments, the dialkylene glycol includes oxydimethanol, diethylene glycol, dipropylene glycol, 3,3-oxydipropan-1-ol, dibutylene glycol, or combinations thereof. In other embodiments, one or more of the dialkylene glycols listed may be excluded from the present invention. Blends of two or more glycols may be used. In some embodiments, monoalkylene glycols may be used in combination with the dialkylene glycols described above. In other embodiments, the glycol used to prepare the poly(dialkylene ester)polyol intermediate is free of monoalkylene glycols.

Dicarboxylic acids suitable for use in preparing the poly(dialkylene ester)polyol intermediate of the present invention may be aliphatic, cyclo-aliphatic, aromatic, or combinations thereof. Suitable acids may contain from 2, 4, or 6 to 20, 15, 8, or 6 carbon atoms, and in some embodiments may contain 2 to 15, 4 to 15, 4 to 8, or even 6 carbon atoms. In some embodiments, the dicarboxylic acids include succinic acid, glutaric acid, adipic acid, pimelic acid, suberic acid, azelaic acid, sebacic acid, dodecanedioic acid, isophthalic acid, terephthalic acid, cyclohexane dicarboxylic acid, or combinations thereof. In other embodiments, one or more of the dicarboxylic acids listed may be excluded from the present invention.

The poly(dialkylene ester)polyol intermediates of the present invention may also be derived from an ester or anhydride of one or more the dicarboxylic acids described above or combinations of such materials. Suitable anhydrides include succinic anhydride, alkyl and/or alkenyl succinic anhydride, phthalic anhydride and tetrahydrophthalic anhydride. In some embodiments, the acid is adipic acid. Blends of two or more acids may be used.

The poly(dialkylene ester)polyol intermediates of the present invention are prepared by reacting one or more of the dialkylene glycol described above with one or more of the dicarboxylic acids described above, and/or one or more of the esters or anhydrides thereof. In some embodiments, more than one equivalent of glycol is used for each equivalent of acid. The preparation includes (1) an esterification reaction of one or more dialkylene glycols with one or more dicarboxylic acids or anhydrides or (2) by transesterification reaction, i.e., the reaction of one or more dialkylene glycols with esters of dicarboxylic acids. Mole ratios generally in excess of more than one mole of glycol to acid are preferred so as to obtain linear chains having a preponderance of terminal hydroxyl groups.

In some embodiments, the poly(dialkylene ester)polyol intermediate of the present invention is used in combination with a polyether polyol intermediate and/or a conventional polyester intermediate. As used herein, the poly(dialkylene ester)polyol intermediates of the present invention may include a mixture of polyester and polyether linkages, but may not contain only polyether linkages or, in some embodiments, more than 70% polyether linkages, relative to the total amount of polyether and polyester linkages. In other embodiments, the compositions of the present invention are substantially free, or free of, polyether polyol intermediates, and such materials are not used in the preparation, where polyether polyol intermediates as used herein can mean intermediates containing only polyether linkages, or containing less than 50, 40, 20, or even 15 percent polyester linkages.

In some embodiments, the poly(dialkylene ester)polyol intermediate of the present invention is used in combination with a polyether polyol intermediate and/or a conventional polyester intermediate. In such embodiments, the ratio of the poly(dialkylene ester)polyol intermediate to the polyether polyol and/or conventional polyester intermediate is about 10:90 to about 90:10, about 25:75 to about 75:25, or about 60:40 to 40:60. In some embodiments, the ratio is such that no more than 50% by weight of the overall composition is polyether polyol and/or conventional polyester intermediate.

As noted above, the poly(dialkylene ester) thermoplastic polyurethane is made by reacting (i) at least one poly(dialkylene ester)polyol intermediate with (ii) at least one diisocyanate and (iii) at least one chain extender. Suitable diisocyanates include: (i) aromatic diisocyanates such as: 4,4'-methylenebis-(phenyl isocyanate) (MDI), m-xylylene diisocyanate (XDI), phenylene-1,4-diisocyanate, 1,5-naphthalene diisocyanate, diphenylmethane-3,3'-dimethoxy-4,4'-diisocyanate (TODI), and toluene diisocyanate (TDI); as well as (ii) aliphatic diisocyanates such as: isophorone diisocyanate (IPDI), 1,4-cyclohexyl diisocyanate (CHDI), decane-1,10-diisocyanate, hexamethylene diisocyanate (HDI), and dicyclohexylmethane-4,4'-diisocyanate. In some embodiments, the diisocyanate is 4,4'-methylenebis(phenyl isocyanate) (MDI). In other embodiments, one or more of the diisocyanates listed may be excluded from the present invention.

A mixture of two or more diisocyanates can be used. Also, small amounts of isocyanates having a functionality greater than 2, such as tri-isocyanates can be used together with the diisocyanates. Large amounts of isocyanates with a functionality of 3 or more should be avoided as they will cause the TPU polymer to be cross linked.

As noted above, the poly(dialkylene ester) thermoplastic polyurethane is made by reacting (i) at least one poly(dialkylene ester)polyol intermediate with (ii) at least one diisocyanate and (iii) at least one chain extender. Suitable chain extenders include glycols and can be aliphatic, aromatic or combinations thereof. In some embodiments, the chain extender is an aromatic glycol, or a mixture of chain extenders is used which includes an aromatic glycol.

In some embodiments, the chain extenders are glycols having from 2 to about 12 carbon atoms. In some embodiments, the glycol chain extenders are lower aliphatic or short chain glycols having from about 2 to about 10 carbon atoms and include, for instance: ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol (CHDM), neopentylglycol, and the like. In some embodiments, the chain extender includes 1,4-butanediol. In some embodiments, the chain extender, and/or the overall TPU, is essentially free of, or even completely free of CHDM.

Aromatic glycols may also be used as the chain extender to make the TPU including benzene glycol and xylene glycol. Xylene glycol is a mixture of 1,4-di(hydroxymethyl)benzene and 1,2-di(hydroxymethyl)benzene. Benzene glycol specifically includes hydroquinone, i.e., hydroquinone bis(hydroxylethyl ether) or bis(beta-hydroxyethyl)ether also known as 1,4-di(2-hydroxyethoxy)benzene and often referred to as HQEE; resorcinol, i.e., bis(beta-hydroxyethyl)ether also known as 1,3-di(2-hydroxyethyl)benzene; catechol, i.e., bis (beta-hydroxyethyl)ether also known as 1,2-di(2-hydroxyethoxy)benzene; and combinations thereof. In some embodiments, the chain extender is HQEE.

A mixture of two or more glycols may be used as the chain extender. In some embodiments, the chain extender is a mixture of HQEE and at least one other chain extender, such as 1,4-butanediol and/or 1,6-hexanediol. In other embodiments, one or more of the chain extenders listed may be excluded from the present invention.

Diamines may also be used as a chain extender, as is well known in the art. In one embodiment of the present invention, the chain extender contains a diamine as a co-chain extender in combination with one or more of the chain extenders described above, such as HQEE. In other embodiments, the present invention does not use any diamines in the preparation of its compositions.

In still other embodiments, the chain extender used in the present invention is essentially free or, or even completely free of, butanediol, ethylene glycol, and/or the diamine co-chain extenders as describe above.

The thermoplastic polyurethane compositions of the present invention may also include a solid. The thermoplastic polyurethane compositions may be from 1 to 99 percent by weight polyurethane elastomer and from 99 to 1 percent by weight of a solid, wherein the solid is incorporated in the thermoplastic polyurethane elastomer. The solid content may also be from 3 to 95, 5 to 97, 10 to 90, or even 5 to 20 or 10 to 20 percent by weight, with the balance of the composition being the polyurethane elastomer.

Suitable solids are mainly inorganic solids, preferably inorganic basic solids selected from the class consisting of oxides, compound oxides, silicates, sulfates, carbonates, phosphates, nitrides, amides, imides and carbides of the elements of the 1st, 2nd, 3rd or 4th main group or the 4th subgroup of the periodic table.

Particular examples are: oxides, such as calcium oxide, silica, alumina, magnesium oxide and titanium dioxide, mixed oxides, for example, of the elements silicon, calcium, aluminum, magnesium and titanium; silicates, such as ladder-type, ino-, phyllo- and tectosilicates, preferably wollastonite, in particular hydrophobicized wollastonite, sulfates, such as those of alkali metals and alkaline-earth metals; carbonates, for example, those of alkali metals and alkaline-earth metals, for example, calcium, magnesium, barium, lithium, potassium and sodium carbonate; phosphates, such as apatites; nitrides; amides; imides; carbides; polymers, such as polyethylene, polypropylene, polystyrene, polytetrafluoroethylene and polyvinylidene fluoride; polyamides; polyimides; and other thermoplastics, thermosets and microgels, solid dispersions, in particular those which comprise the polymers mentioned above, and also mixtures of two or more of the above mentioned solids.

Particularly to be mentioned are: Wollastonite ($CaSiO_3$), $CaCO_3$, mixed oxides or carbonates of Mg and Ca, such as dolomite, in the ground and precipitated form, respectively, silicates ($SiO_2$), talc ($SiO_2*MgO$), $Al_2O_3$, kaolin ($Al_2O_3*SiO_2$), and synthesized ceramics, polymer powders which do not solve into electrolyte solvents, preferably those as specifically mentioned above, and surface-treated fillers, which have been treated with, e.g., silane coupling agents which are electrochemically stable.

According to the invention, the solids used may also be inorganic Li-ion-conducting solids, preferably an inorganic basic Li-ion-conducting solid.

Examples of these are: lithium borates, such as $Li_4B_6O_{11}*xH_2O$, $Li_3(BO_2)_3$, $Li_2B_4O_7*xH_2O$, $LiBO_2$, where x can be a number from 0 to 20; lithium aluminates, such as $Li_2O*Al_2O_3*H_2O$, $Li_2Al_2O_4$, $LiAlO_2$; lithium aluminosilicates, such as lithium-containing zeolites, feldspars, feldspathoids, phyllo- and inosilicates, and in particular $LiAlSi_2O_6$ (spodumene), $LiAlSiO_{10}$ (petullite), $LiAlSiO_4$ (eucryptite), micas, such as $K[Li,Al]_3[AlSi]_4O_{10}$ (F—OH)$_2$/ $K[Li,Al,Fe]_3[AlSi]_4O_{10}$ (F—OH)$_2$; lithium zeolites, in particular those whose form is fiber-like, sheet-like or cube-like, in particular those of the formula $Li_2/z O*Al_2O_3*xSiO_2*yH_2O$ where z corresponds to the valence, x is from 1.8 to about 12 and y is from 0 to about 8; lithium carbides, such as $Li_2C_2$, $Li_4C$; $Li_3N$; lithium oxides and lithium mixed oxides, such as $LiAlO_2$, $Li_2MnO_3$, $Li_2O$, Li$_2$O$_2$, Li$_2$MnO$_4$, Li$_2$TiO$_3$; Li$_2$NH; LiNH$_2$; lithium phosphates, such as Li$_3$PO$_4$, LiPO$_3$, LiAlFPO$_4$, LiAl(OH)PO$_4$, LiFePO$_4$, LiMnPO$_4$; Li$_2$CO$_3$; lithium silicates in the form of ladder-type, ino-, phyllo- and tectosilicates, such as Li$_2$SiO$_3$, Li$_2$SiO$_4$, Li$_2$S—SiS$_2$, and mechanically milled products from Li$_2$S, SiS$_2$ and Li$_4$SiO$_2$, wherein the most preferably product constituted by these three compounds has the following composition: 95 wt.-% (0.6 Li$_2$S 0.4 SiS$_2$) 5 wt.-% Li$_4$SiO$_4$, and Li$_6$Si$_2$; lithium sulfates, such as Li$_2$SO$_4$, LiHSO$_4$, LiKSO$_4$; the Li compounds mentioned during the discussion of the cathode layer, the presence of conductive carbon black being excluded when these are used as solid III; and also mixtures of two or more of the Li-ion-conducting solids mentioned above.

In some embodiments, the thermoplastic polyurethane compositions of the present invention may further comprise a metal-containing salt, salt complex, or salt compound formed by the union of metal ion with a non-metallic ion or molecule. Examples of salts useful in the present invention include: LiClO$_4$, LiN(CF$_3$SO$_2$)$_2$, LiPF$_6$, LiAsF$_6$, LiI, LiCl, LiBr, LiSCN, LiSO$_3$CF$_3$, LiNO$_3$, LiC(SO$_2$CF$_3$)$_3$, Li$_2$S, and LiMR$_4$, where M is Al or B, and R is a halogen, hydrocarbyl, alkyl or aryl group. In one embodiment, the salt is the lithium salt of trifluoromethane sulfonic acid, or LiN(CF$_3$SO$_2$)$_2$, which is commonly referred to as lithium trifluoromethane sulfonamide. The effective amount of the selected salt added to the one-shot polymerization may be at least about 0.10, 0.25, or even 0.75 parts by weight based on 100 parts by weight of the polymer.

Suitable salts also include halogen-free lithium-containing salt. In some embodiments, the salt is represented by the formula:

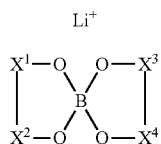

wherein each -X$^1$-, -X$^2$-, -X$^3$- and -X$^4$- is independently —C(O)—, —C(R$^1$R$^2$)—, —C(O)—C(R$^1$R$^2$)— or —C(R$^1$R$^2$)—C(R$^1$R$^2$)— where each R$^1$ and R$^2$ is independently hydrogen or a hydrocarbyl group and wherein the R$^1$ and R$^2$ of a given X group may be linked to form a ring. In some embodiments, the salt is represented by the formula above wherein -X$^1$-, -X$^2$-, -X$^3$- and -X$^4$- are —C(O)—. Suitable salts also include the open, -ate structures of such salts, including Lithium bis(oxalate)borate. In some embodiments, the halogen-free lithium-containing salt comprises lithium bis(oxalato)borate, lithium bis(glycolato)borate, lithium bis(lactato)borate, lithium bis(malonato)borate, lithium bis(salicylate)borate, lithium (glycolato, oxalato)borate, or combinations thereof.

In other embodiments, the thermoplastic polyurethane compositions of the present invention are substantially free to completely free of any or all of the solids and/or metal containing salts described herein. In some embodiments, the thermoplastic polyurethane compositions contain less than 10% by weight of such materials, and in other embodiments less than 8%, 6%, 5%, 3%, or even 2% by weight of such materials.

The solids, when present, may be substantially insoluble in the liquid used as electrolyte, and also be electrochemically inert in the battery medium. In some embodiments, the solids are basic solids. For the purposes of the invention, basic solids are those whose mixture with a liquid water-containing diluent, which itself has a pH of not more than 7, has a higher pH than this diluent. In some embodiments, the solids have a primary particle size of from 5 nm to 25 microns, preferably from 0.01 to 10 microns and in particular from 0.01 to 5 microns, and more particular 0.02 to 1 microns, the particle sizes given being determined by electron microscopy. The melting point of the solids is preferably above the usual operating temperature of the electrochemical cell, and melting points of above 120° C., in particular above 150° C., have proven particularly advantageous. The solids here may be symmetrical in their external shape, i.e., have a dimensional ratio of height:width:length (aspect ratio) of about 1 and be shaped as spheres or pellets, be approximately round in shape, or else be in the shape of any desired polyhedron, such as a cuboid, tetrahedron, hexahedron, octahedron or bipyramid, or may be distorted or asymmetric, i.e., have a dimensional ratio height:width:length (aspect ratio) which is not equal to 1 and be, for example, in the form of needles, asymmetrical tetrahedra, asymmetrical bipyramids, asymmetrical hexa- or octahedra, lamellae or plates, or have fiber-like shape. If the solids are asymmetric particles, the upper limit given above for the primary particle size refers to the smallest axis in each case.

The thermoplastic polyurethane compositions may also comprise other thermoplastic polymers, such as polyethylene oxide, copolymers on the basis of polyvinylidenedifluoride, polyacrylonitrile and poly(meth)acrylates, such as poly(methyl methacrylate). When using these other polymers, the ratio thereof may be within the range of 5 to 400 parts by weight based on 100 parts by weight of the thermoplastic polyurethane elastomer.

The above defined thermoplastic polyurethane elastomers may be produced according to commonly known processes.

In some embodiments, the poly(dialkylene ester) thermoplastic polyurethane is blended with a matrix or base polymer to form a polymer blend. These blends may be made with the salt-modified polymers described herein.

Suitable base polymers as defined herein can be a homopolymer or a copolymer. The base polymer may be a blend of multiple base polymers, and may include any of the additives described above, including ESD (electrostatic dissipative) additives. In some embodiments, the base polymer and/or the compositions of the present invention can be substantially free of or even free of ESD additives.

The base polymer may include:
(i) a polyolefin (PO), such as polyethylene (PE), polypropylene (PP), polybutene, ethylene propylene rubber (EPR), polyoxyethylene (POE), cyclic olefin copolymer (COC), or combinations thereof;
(ii) a styrenic, such as polystyrene (PS), acrylonitrile butadiene styrene (ABS), styrene acrylonitrile (SAN), styrene butadiene rubber (SBR or HIPS), polyalphamethylstyrene, methyl methacrylate styrene (MS), styrene maleic anhydride (SMA), styrene-butadiene copolymer (SBC) (such as styrene-butadiene-styrene copolymer (SBS) and styrene-ethylene/butadiene-styrene copolymer (SEBS)), styrene-ethylene/propylene-styrene copolymer (SEPS), styrene butadiene latex (SBL), SAN modified with ethylene propylene diene monomer (EPDM) and/or acrylic elastomers (for example, PS-SBR copolymers), or combinations thereof;
(iii) a thermoplastic polyurethane (TPU);
(iv) a polyamide, such as Nylon™, including polyamide 6,6 (PA66), polyamide 11 (PA11), polyamide 12 (PA12), a copolyamide (COPA), or combinations thereof;

(v) an acrylic polymer, such as poly(methyl acrylate), poly (methylmethacrylate), or combinations thereof;
(vi) a polyvinylchloride (PVC), a chlorinated polyvinylchloride (CPVC), or combinations thereof;
(vii) a polyoxymethylene, such as polyacetal;
(viii) a polyester, such as polyethylene terephthalate (PET), polybutylene terephthalate (PBT), copolyesters and/or polyester elastomers (COPE) including polyether-ester block copolymers such as glycol modified polyethylene terephthalate (PETG)poly(lactic acid) (PLA), or combinations thereof;
(ix) a polycarbonate (PC), a polyphenylene sulfide (PPS), a polyphenylene oxide (PPO), or combinations thereof; or combinations thereof.

The thermoplastic polyurethane compositions according to the invention may also contain a plasticizer. The plasticizers used may be aprotic solvents, preferably those which solvate Li ions, for example, dimethyl carbonate, diethyl carbonate, dipropyl carbonate, diisopropyl carbonate, dibutyl carbonate, ethylene carbonate and propylene carbonate; oligoalkylene oxides, such as dibutyl ether, di-tert-butyl ether, dipentyl ether, dihexyl ether, diheptyl ether, dioctyl ether, dinonyl ether, didecyl ether, didodecyl ether, ethylene glycol dimethyl ether, ethylene glycol diethyl ether, 1-tert-butoxy-2-methoxyethane, 1-tert-butoxy-2-ethoxyethane, 1,2-dimethoxypropane, 2-methoxyethyl ether, 2-ethoxyethyl ether, diethylene glycol dibutyl ether, diethylene glycol tert-butyl methyl ether, triethylene glycol dimethyl ether, tetraethylene glycol dimethyl ether, gamma-butyrolactone and dimethylformamide; hydrocarbons of the formula $C_nH_{2n+2}$ where $7<n<50$; organic phosphorus compounds, in particular phosphates and phosphonates, such as trimethyl phosphate, triethyl phosphate, tripropyl phosphate, tributyl phosphate, triisobutyl phosphate, tripentyl phosphate, trihexyl phosphate, trio ctyl phosphate, tris(2-ethylhexyl)phosphate, tridecyl phosphate, diethyl n-butyl phosphate, tris(butoxyethyl)phosphate, tris(2-methoxyethyl)phosphate, tris(tetrahydrofuryl)phosphate, tris(1H,1H,5H-octafluoropentyl)phosphate, tris(1H, 1H-trifluoroethyl) phosphate, tris(2-(diethylamino)ethyl)phosphate, diethyl ethylphosphonate, dipropyl propylphosphonate, dibutyl butylphosphonate, dihexyl hexylphosphonate, dioctyl octylphosphonate, ethyl dimethylphosphonoacetate, methyl diethylphosphonoacetate, triethyl phosphonoacetate, dimethyl 2-oxopropylphosphonate, diethyl 2-oxopropylphosphonate, dipropyl 2-oxopropylphosphonate, ethyl diethoxyphosphinylformate, trimethyl phosphonoacetate, triethyl phosphonoacetate, tripropyl phosphonoacetate and tributyl phosphonoacetate; organic sulfur compounds, such as sulfates, sulfonates, sulfoxides, sulfones and sulfites, for example, dimethyl sulfite, diethyl sulfite, glycol sulfite, dimethyl sulfone, diethyl sulfone, dipropyl sulfone, ethylpropyl sulfone, dibutyl sulfone, tetramethylene sulfone, methylsulfolane, dimethyl sulfoxide, diethyl sulfoxide, dipropyl sulfoxide, dibutyl sulfoxide, tetramethylene sulfoxide, ethyl methanesulfonate, 1,4-butanediol bis(methanesulfonate), diethyl sulfate, dipropyl sulfate, dibutyl sulfate, dihexyl sulfate, dioctyl sulfate and $SO_2ClF$; and nitriles, such as acrylonitrile; dispersants, in particular those with surfactant structure; and mixtures of these.

The thermoplastic polyurethane compositions of the present invention may further include additional useful additives, where such additives can be utilized in suitable amounts. These optional additional additives include mineral and/or inert fillers, lubricants, processing aids, antioxidants, hydrolytic stabilizers, acid scavengers, and other additives as desired. Useful fillers include diatomaceous earth (superfloss) clay, silica, talc, mica, wallostonite, barium sulfate, and calcium carbonate. If desired, useful antioxidants include phenolic antioxidants. Useful lubricants include metal stearates, paraffin oils and amide waxes. Additives can also be used to improve the hydrolytic stability of the TPU polymer. Each of these optional additional additives described above may be present in, or excluded from, the thermoplastic polyurethane compositions of the invention.

When present, these additional additives may be present in the thermoplastic polyurethane compositions of the present invention from 0 or 0.01 to 5 or 2 weight percent of the composition. These ranges may apply separately to each additional additive present in the composition or to the total of all additional additives present.

The composition according to the invention may be dissolved and dispersed in an inorganic, but preferably organic liquid diluent, the resulting mixture being intended to have a viscosity of preferably 100 to 50,000 mPas, and then applying this solution or dispersion in a manner known per se, such as by casting, spraying, pouring, dipping, spin coating, roller coating or printing—by relief, intaglio, planographic or screen printing—to a carrier material. Subsequent processing can be done by customary methods, for example by removing the diluent and curing the binder.

Suitable organic diluents are aliphatic ethers, especially tetrahydrofuran and dioxane, hydrocarbons, especially hydrocarbon mixtures such as petroleum spirit, toluene and xylene, aliphatic esters, especially ethyl acetate and butyl acetate, and ketones, especially acetone, ethyl methyl ketone, cyclohexanone, diethylformamide, chloroform, 1,1,2,2-tetrachloro ethane, diethylacetamide, dimethylformamide, dimethylacetamide, N-methylpyrrolidone, 1,1,1 trichloroethane, or combinations thereof.

Suitable carrier materials are those materials customarily used for electrodes, preferably metals such as aluminum and copper. It is also possible to use temporary supports, such as films, especially polyester films such as polyethylene terephthalate films. Such films may advantageously be provided with a release layer, preferably comprising polysiloxanes.

In some embodiments, the diisocyanate used in the preparation of the composition describe above comprises: 4,4'-methylenebis-(phenyl isocyanate); hexamethylene diisocyanate; 3,3'-dimethylbiphenyl-4,4'-diisocyanate; m-xylylene diisocyanate; phenylene-1,4-diisocyanate; naphthalene-1,5-diisocyanate; diphenylmethane-3,3'-dimethoxy-4,4'-diisocyanate; toluene diisocyanate; isophorone diisocyanate; 1,4-cyclohexyl diisocyanate; decane-1,10-diisocyanate; dicyclohexylmethane-4,4'-diisocyanate; or combinations thereof; and the chain extender used in the preparation of the composition describe above comprises: hydroquinone bis (beta-hydroxyethyl)ether; ethylene glycol; diethylene glycol; propylene glycol; dipropylene glycol; 1,4-butanediol; 1,6-hexanediol; 1,3-butanediol; 1,5-pentanediol; di(hydroxyethyl)ether; neopentylglycol; or combinations thereof.

In some embodiments, the poly(dialkylene ester)polyol intermediate used in the preparation of the compositions describe above comprises poly(diethylene glycol adipate), and the diisocyanate comprises 4,4'-methylenebis-(phenyl isocyanate); and the chain extender comprises butanediol, benzene glycol, or combinations thereof.

In any of the above described embodiments, the thermoplastic polyurethane compositions may be made from a polyester polyol component substantially free of polyether polyols. In still other embodiments, the thermoplastic polyurethane compositions may further comprise at least one base polymer. Suitable base polymers include: a polyolefin; a styrenic resin; a thermoplastic polyurethane, a polyamide; an acrylic polymer; a polyvinylchloride; a polyvinylidene fluoride; a polyethylene oxide; an ethylene oxide-propylene oxide copolymer; a polyacrylonitrile; a polyoxymethylene; a polyester; a polycarbonate; a polyphenylene oxide; polyphenylene sulfide; or combinations thereof.

In some embodiments, fillers may be used in the thermoplastic polyurethane compositions of the invention. Suitable fillers include nanofillers and even nanofibers.

The Electrochemical Cell

The present invention relates to electrochemical cells which comprise the electrodes defined above and generally include a positive electrode and a negative electrode. According to another aspect of the present invention, there is provided a lithium battery containing the lithium battery cathode and/or anode. Furthermore, it relates to the use of the electrodes as defined herein in electrochemical cells such as a lithium battery. Electrochemical cells include batteries, such as the lithium ion batteries noted herein, and also include capacitors and similar devices, such as electric double-layer capacitors also referred to as super capacitors or ultra-capacitors.

Operatively, disposed between the positive and negative electrodes is an electrolyte system. The electrolyte system typically includes an organic polymeric support structure adapted to engage, as for example, by absorption, an electrochemically active species or material. The electrochemically active material may be a liquid electrolyte, such as a metal salt that is dissolved in an organic solvent and which is adapted to promote ion transport between said positive and negative electrodes.

As outlined above, the present invention provides electrodes to be suitably used in electrochemical cells which has the following desired characteristics: (a) the binder compositions described above and electrodes made therefrom, can have improved adhesion, for example, with the collectors, fillers and separators they are used with and so can require less material per unit than more conventional alternatives, also providing less internal resistance, higher capacity, better rate performance, and longer cycles live in the resulting electrochemical cells; (b) the binder compositions described above and electrodes made therefrom, can have higher ionic conductivity, than more conventional alternatives, and this can provide less internal resistance, higher capacity, better rate performance, and longer cycles live in the resulting electrochemical cells; (c) the binder compositions described above and electrodes made therefrom, can have improved low temperature properties compared to more conventional alternatives; (d) the binder compositions described above and electrodes made therefrom, can provide better dispersion of electrode active fillers, compared to more conventional alternatives; (d) the binder compositions described above and electrodes made therefrom, can provide improved wettability and absorption of liquid electrolyte, compared to more conventional alternatives, thus helping to reduce leaks and so improving safety of the resulting electrochemical cells.

The electrochemical cells of the invention generally include a positive electrode and a negative electrode, where the electrodes may be any of those described above. The positive electrode may be fabricated as described above using active materials including, but not limited to, manganese oxide, nickel oxide, cobalt oxide, vanadium oxide, and combinations thereof. The negative electrode may likewise be fabricated as described above from any of a number of electrode materials known to those of ordinary skill in the art. Selection of the active material for the negative electrode is dependent on the active material of the positive electrode so as to assure an electrochemical cell which will function properly for a given application. Accordingly, the negative electrode may be fabricated from, for example, alkali metals, alkali metal alloys, carbon, graphite, petroleum coke, and combinations thereof.

The invention provides for an electrochemical cell comprising the positive and negative electrodes described above. In some embodiments, the electrochemical cell also includes: (I) a polymer electrolyte disposed between said positive and negative electrodes, wherein the polymer electrolyte comprises (A) a poly(dialkylene ester) thermoplastic polyurethane composition and (B) an electrochemically active electrolyte species; (II) a separator membrane disposed between said positive and negative electrodes, wherein the said membrane comprises (A) a poly(dialkylene ester) thermoplastic polyurethane composition; or (III), both (I) and (II). Each of the poly(dialkylene ester) thermoplastic polyurethane compositions may be any of the materials described above and in some embodiments is made by reacting (i) at least one poly(dialkylene ester)polyol intermediate with (ii) at least one diisocyanate and (iii) at least one chain extender, wherein (i), the poly(dialkylene ester)polyol intermediate, comprises an intermediate derived from at least one dialkylene glycol and at least one dicarboxylic acid, or an ester or anhydride thereof. In some embodiments, the chain extender comprises hydroquinone bis(beta-hydroxyethyl)ether.

The electrochemical cells of the invention may have a charge/discharge cycle life of >500, >750 or even >1000 cycles. The electrochemical cells of the invention may have a charge/discharge efficiency of >90% or even >95% after 500 cycles. The electrochemical cells of the invention may have an operation window of −30 to 100 or of −10 to 70° C., where any one or combination of these performance characteristics are met over the defined operation window. The electrochemical cells of the invention may be essentially free of any rigid metallic casing and may even be completely free of any rigid metallic casing. The electrochemical cells of the invention may be a pouch type battery.

In still further embodiments, the electrochemical cells of the invention meet at least one of, or any combination of, the following characteristics: (i) a charge/discharge cycle life of >500, >750 or even >1000 cycles; (ii) a charge/discharge efficiency of >90% or even >95% after 500 cycles; (iii) an operation window of −10 to 70° C.; (iv) being essentially free of any rigid metallic casing; (v) being a pouch type battery.

In still other embodiments, the poly(dialkylene ester) thermoplastic polyurethane compositions of the present invention, as well as the membranes, electrolyte systems, and/or electrochemical cells made using such polyurethane compositions, are substantially free of inorganic solids. By substantially free, it is meant that the composition contains <10% by weight inorganic solids, or even <5% by weight or <1% by weight inorganic solids. In still other embodiments, the compositions are essentially free of, or even completely free of inorganic solids.

An electrolytic solution of the electrochemical cell includes a lithium salt. Any lithium compound that dissolves in an organic solvent to produce lithium ions can be used as a lithium salt. For example, at least one ionic lithium salt such as lithium perchlorate ($LiClO_4$), lithium tetrafluoroborate ($LiBF_4$), lithium hexafluorophosphate ($LiPF_6$), lithium trifluoromethanesulfonate ($LiCF_3SO_3$), and lithium bis(trifluoromethanesulfonyl)amide ($LiN(CF_3SO_2)_2$) can be used. A concentration of the lithium salt may be in the range of 0.5-2.0M. If the concentration of the lithium salt is outside of this range, ionic conductivity may be undesirably low. An organic electrolytic solution containing such an inorganic salt is used so that a path through which lithium ions flow in a current flow direction can be formed. Suitable salts also include the halogen-free lithium-containing salts described above. In some embodiments, the halogen-free lithium-containing salt comprises lithium bis(oxalato)borate, lithium bis(glycolato) borate, lithium bis(lactato)borate, lithium bis(malonato)borate, lithium bis(salicylate)borate, lithium (glycolato,oxalato)borate, or combinations thereof.

Examples of the organic solvent for the electrolytic solution suitable for the present invention include polyglymes, oxolanes, carbonates, 2-fluorobenzene, 3-fluorobenzene, 4-fluorobenzene, dimethoxyethane, and diethoxyethane. These solvents may be used individually or in a combination of two or more.

Examples of polyglymes include diethyleneglycol dimethylether ($CH_3(OCH_2CH_2)_2OCH_3$), diethyleneglycol diethylether ($C_2H_5(OCH_2CH_2)_2O-C_2H_5$), triethyleneglycol dimethylether ($CH_3(OCH_2CH_2)_3OCH_3$), and triethyleneglycol diethylether ($C_2H_5(OCH_2CH_2)_3OC_2H_5$). These polyglymes may be used individually or in a combination of two or more.

Examples of dioxolanes include 1,3-dioxolane, 4,5-diethyl-dioxolane, 4,5-dimethyl-dioxolane, 4-methyl-1,3-dioxolane, and 4-ethyl-1,3-dioxolane. These dioxolanes may be used individually or in a combination of two or more.

Examples of carbonates include methylene carbonate, ethylene carbonate, diethyl carbonate, ethyl methyl carbonate, dimethyl carbonate, gamma-butyrolactone, propylene carbonate, dimethyl carbonate, methylethyl carbonate, diethyl carbonate, and vinylene carbonate. These carbonates may be used individually or in a combination of two or more.

The organic solvent may be a mixture of ethylene carbonate (EC), ethylmethyl carbonate (EMC), propylene carbonate (PC), and fluorobenzene (FB); and a mixture of diglyme (DGM) (also called as "diethyleneglycol dimethylether"), dimethoxyethane (DME), and 1,3-dioxolane (DOX).

The amount of the organic solvent is the same as that of an organic solvent used in a conventional lithium battery.

The electrolytic solution according to an embodiment of the present invention is added by using the conventional methods when manufacturing lithium batteries. The conventional methods include, but are not limited to, the following methods: (1) A method including injecting the electrolytic solution into a capsulated electrode assembly, which includes a cathode, an anode and a separator; (2) A method including: coating electrodes or a separator with a polymer electrolyte containing a matrix forming resin and the electrolytic solution; forming an electrode assembly using the coated electrodes and separator; and sealing the electrode assembly in a battery case; or (3) A method including: coating electrodes or a separator with a polymer electrolyte containing a matrix forming resin and the electrolytic solution; forming an electrode assembly using the coated electrodes and separator; sealing the electrode assembly in a battery case; and polymerizing inside of the battery. Here, this method can be applied when a free polymer or polymerization monomer is used as the matrix forming resin.

Any material that is commonly used as a binder of an electrode plate can be used as a matrix forming polymer resin in the method according to the present invention without limitation. Examples of the matrix forming polymer resin include vinylidene fluoride/hexafluoropropylene copolymer, polyvinylidenefluoride, polyacrylonitrile, polymethylmethacrylate and combinations of these materials.

The matrix forming polymer resin may further include a filler that enhances mechanical strength of the polymer electrolyte. Examples of the filler include silica, kaolin, and alumina. In addition, the matrix forming polymer resin can further include a plasticizer if needed.

The electrolytic solution according to the present invention can be used in common lithium batteries, such as primary batteries, secondary batteries, and sulfur batteries.

The electrolytic solution according to the present invention can be used in cylindrical and rectangular lithium batteries, without limitation.

In some embodiments, the invention further provides for an electrolyte system which combines the mechanical stability and freedom from leakage offered by solid electrolytes with the high ionic conductivities of liquid electrolytes. The electrolyte system may comprise an organic polymeric support structure adapted to engage, as for example, by absorption, an electrochemically active species or material. The electrochemically active material may be a liquid electrolyte, such as a metal salt that is dissolved in an organic solvent and which is adapted to promote ion transport between the positive and negative electrodes of an electrochemical cell (or battery).

The liquid electrolyte absorbed by the organic support structure may be selected to optimize performance of the positive and negative electrodes. In one embodiment, for a lithium based electrochemical cell, the liquid electrolyte absorbed by the organic support structure is typically a solution of an alkali metal salt, or combination of salts, dissolved in an aprotic organic solvent or solvents. Typical alkali metal salts include, but are not limited to, salts having the formula $M^+X^-$ where $M^+$ is a alkali metal cation such as $Li^+$, $Na^+$, $K^+$ and combinations thereof; and $X^-$ is an anion such as $Cl^-$, $Br^-$, $I^-$, $ClO_4^-$, $BF_4^-$, $PF_5^-$, $AsF_6^-$, $SbF_6^-$, $CH_3CO_2^-$, $CF_3SO_3^-$, $(CF_3O_2)_2N^-$, $(CF_3SO_2)_2N^-$, $(CF_3SO_2)_3C^-$, and combinations thereof. In some embodiments, the salts are lithium salts. Aprotic organic solvents include, but are not limited to, propylene carbonate, ethylene carbonate, diethyl carbonate, dimethyl carbonate, dipropyl carbonate, dimethyl sulfoxide, acetonitrile, dimethoxyethane, diethoxyethane, tetrahydrofuran, and combinations thereof. Suitable salts also include the halogen-free lithium-containing salts described above. In some embodiments, the halogen-free lithium-containing salt comprises lithium bis(oxalato)borate, lithium bis(glycolato) borate, lithium bis(lactato)borate, lithium bis(malonato)borate, lithium bis(salicylate)borate, lithium (glycolato,oxalato)borate, or combinations thereof.

The organic polymeric support structure may be fabricated of any of the polyurethane elastomers compositions described above.

In some embodiments, the electrolyte system for an electrochemical cell comprises an electrolyte active species dispersed in a polymeric support structure comprising a poly (dialkylene ester) thermoplastic polyurethane composition made by reacting (i) at least one poly(dialkylene ester)polyol intermediate with (ii) at least one diisocyanate and (iii) at least one chain extender; wherein (i), the poly(dialkylene ester) polyol intermediate, comprises an intermediate derived from at least one dialkylene glycol and at least one di-carboxylic acid, or an ester or anhydride thereof.

The instant electrolyte system also has the important advantage of having a polymeric support structure which is easily processable and reprocessable, since the materials are thermoplastic elastomers. Other prior art gel systems are typically permanently chemically cross-linked either by radiation (e-beam, UV, etc.) or by using a chemical crosslinking agent, for example, diisocyanates which can be used to cross-link polyether triols.

Any separator that is commonly used in lithium batteries can be used in the present invention without limitation. The separator may have high water binding capacity and is less resistant to the migration of ions in the electrolyte. Examples of the separator include a glass fiber, polyester, TEFLON, polyethylene, polypropylene, polytetrafluoroethylene (PTFE) and combinations of these materials, which may be in non-woven or woven fabric form. In particular, the separator may be a polyethylene and/or polypropylene multi-porous membrane, which is less reactive to an organic solvent and guarantees safety.

In some embodiments, the invention further provides for a membrane or separator made from any of the poly(dialkylene ester) thermoplastic polyurethane compositions described above.

In some embodiments, the membrane of the present invention has a Li+ conductivity of >1.0E-5 S/cm (>1.0×10$^{-5}$ S/cm, which stands for Siemens per centimeter), or >1E-4 S/cm, or >1E-3 S/cm, as measured with a Solartron analytical system at room temperature, typically 20 to 30° C. (1470 & 1400). In some embodiments, the membrane has at least one of the following characteristics:

(i) a weight average molecular weight of at least 60,000; (ii) a melting point of >120° C., >140° C., or even >160° C.; and (iii) a glass transition temperature of <−10° C., or <−20° C., or even <−30° C.

In still further embodiments the electrochemical cell may be what is referred to as a "solid state battery" where the cell contains solid electrodes and a solid electrolyte/separator system. Sometimes this solid electrolyte/separator system is referred to as a solid electrolyte that negates the need for a separator and/or membrane, but that is only because the solid electrolyte effectively acts as the separator and/or membrane. In such embodiments, the solid electrodes of the cell may be the thermoplastic polyurethane-based electrode described above, and the solid electrolyte/separator system can be the thermoplastic polyurethane-based separator compositions described above.

It is known that some of the materials described above may interact in the final formulation, so that the components of the final formulation may be different from those that are initially added. For instance, metal ions (of, e.g., a detergent) can migrate to other acidic or anionic sites of other molecules. The products formed thereby, including the products formed upon employing the composition of the present invention in its intended use, may not be susceptible of easy description. Nevertheless, all such modifications and reaction products are included within the scope of the present invention; the present invention encompasses the composition prepared by admixing the components described above.

EXAMPLES

The invention will be further illustrated by the following examples, which sets forth particularly advantageous embodiments. While the examples are provided to illustrate the present invention, they are not intended to limit it.

Example 1

The table below illustrates polyurethane formulations. All samples are made with 4,4'-methylenebis-(phenyl isocyanate) (MDI) and are prepared using conventional polyurethane melt polymerization by reactive extrusion. Samples 1a to 1d below vary only in their hard segment content with Sample 1a having the lowest hard segment content and Sample 1d having the highest hard segment content.

TABLE 1

Chemical Compositions for Example 1

| Sample No | Polyol | Chain Extender |
|---|---|---|
| 1a | 3000 MW poly(diethylene glycol adipate) | HQEE |
| 1b | 3000 MW poly(diethylene glycol adipate) | HQEE |
| 1c | 3000 MW poly(diethylene glycol adipate) | HQEE |
| 1d | 3000 MW poly(diethylene glycol adipate) | HQEE |

Example 2

Table 2 below summarizes the results for the polyurethane samples in Example 1. Shore A hardness (5 sec) is tested in accordance with ASTM D-2240, and a higher result indicates a harder material. Polyurethane membranes are dried in the vacuum oven at 80° C. for 24 hours and then immersed into electrolyte for 12 hours before assembled between electrodes for conductivity test. Membrane samples are swelled dimensionally when soaked in electrolyte, and the change in dimension as well as the weight change is measured.

TABLE 2

Test Results of Samples in Example 1

| Sample No | Hardness[1] | Li Ion Conductivity[2] (mS/cm) | Electrolyte Uptake[3] (%) | Swelling[4] Radial (%) | Axial (%) |
|---|---|---|---|---|---|
| Comp 1[5] | 72D | 0.05 | 28 | 3 | 0 |
| 1a | 87A | 1.24 | 203 | 29 | 7 |
| 1b | 91A | 2.66 | 143 | 35 | 5 |
| 1c | 94A | 0.51 | 124 | 27 | 4 |
| 1d | 95A | 1.18 | 117 | 26 | 4 |

[1]Hardness is presented in a Shore A units, as measured by ASTM D-2240.
[2]Li ion conductivity is present in S/cm. The values in the table above are averages of three separate test results. Results were obtained by dipping the membrane to be tested into a liquid electrolyte (1.2M LiPF$_6$ in a 30:70 blend of ethylene carbonate:ethyl methyl carbonate) for 12 hours, then removing the membrane, wiping the surface with filter paper to remove excess liquid electrolyte, placing the membrane sandwiched between two stainless steel electrodes, and then measuring by electrochemical impedance spectroscopy using Solartron 1470E Multistat (London Scientific, Canada). The frequency was set from 0.1 MHz to 10 Hz with 10 mV amplitude.
[3]Electrolyte takeup is measured by weighing the sample before and after soaking in electrolyte (1.2M LiPF$_6$ in a 30:70 blend of ethylene carbonate:ethylmethyl carbonate) for 12 h and calculating by equation: Electrolyte takeup (%) = (sample weight after soaking − sample weight before soaking)/sample weight before soaking × 100%.
[4]Swelling is evaluated using a liquid electrolyte (1.2M LiPF$_6$ in a 30:70 blend of ethylene carbonate:ethylmethyl carbonate). The dimension of film samples was measured before and after soaking in the liquid electrolyte for 12 hour. The axial swelling = (thickness after soaking − thickness before soaking)/thickness before soaking × 100%. The radial swelling = (diameter after soaking − diameter before soaking)/diameter before soaking × 100%.
[5]Comparative Example 1 (Comp 1) is PVDF.

Example 3

For anode preparation, a copper foil is coated with slurry composed of MCMB, Super P® Li (acetylene black), and binder material in NMP. Binder material is first dissolved in NMP at 10 wt % concentration. With the weight ratios shown in Table 3, MCMB and Super P® Li powders are mixed and grinded into powder in agate mortar. The powder mixture is then added into binder NMP solution to form slurry, which is then coated onto copper foil by doctor blade with controlled gap of 40-60 µm. The infrared lamp is used to remove the NMP solvent before drying at 80° C. in the vacuum oven for 12 h. The dried electrode is pressed by hydraulic press (Carver 4122) at 10 MPa.

For cathode preparation, the same procedure described above is used except that $LiFePO_4$ is used instead of MCMB and the slurry is coated onto aluminium foil, followed by drying process to make the cathode.

TPU samples in Example 1 are used as binder material to make cathode and anode, and those with PVDF binder are also prepared for comparative purpose. Table 3 illustrates the electrode formulations and all the samples contain the same weight percentage of binder material.

TABLE 3

Anode and Cathode Formulations for Example 3

| Electrode | Sample No | MCMB (%) | LiFePO$_4$ (%) | PVDF (%) | Sample 1a (%) | Sample 2 (%) | Super P ® Li (%) |
|---|---|---|---|---|---|---|---|
| Anode | Comparative 2 | 85.00 | — | 10.00 | — | — | 5.00 |
| | 3 | 85.00 | — | — | 10.00 | — | 5.00 |
| | 4 | 85.00 | — | — | — | 10.00 | 5.00 |
| Cathode | Comparative 3 | — | 85.00 | 10.00 | — | — | 5.00 |
| | 5 | — | 85.00 | — | 10.00 | — | 5.00 |
| | 6 | — | 85.00 | — | — | 10.00 | 5.00 |

Example 4

Coin cells (CR2016) are made of two circular electrode discs with the combinations shown in Table 4 and a porous separator (Celgard® 3501) in between. All coin cells are assembled in an argon-filled glove box at oxygen level below 0.1 pm and humidity level below 0.1 ppm. Electrode discs are punched out from the anode and cathode laminates. The cathode disc (1.4 mm) is placed in the center of the coin cell outer shell. A separator (1.6 mm) is placed concentric on top of the cathode. 6 drops of electrolyte are loaded on the surface of the separator. The anode disc is placed on the top of separator. A stainless steel spacer is put on the top of anode and followed by a disk spring. The stack is then covered by a lid and cramped closed with a hydraulic press at 10 MPa. Electrolyte is prepared using 1.2 M $LiPF_6$ in EC/EMC (30/70) blend.

TABLE 4

Coin Cell Assembly for Example 4

| Sample No | Anode | Cathode |
|---|---|---|
| Comparative 4 | Comparative 2 | Comparative 3 |
| 7 | Sample 3 | Sample 5 |
| 8 | Sample 4 | Sample 6 |

Example 5

Constant current charge and discharge test is conducted in Solartron 1470E Multistat (London Scientific, Canada) to evaluate the coin cell cycle life. The cut-off voltage is set from 2 V to 3.8 V with the cycle rate of 1 C. The test results are presented in Table 5. The capacity was measured in unit of mAh per gram of active materials ($LiFePO_4$ for cathode and MCMB for anode).

TABLE 5

Cell Charge/Discharge Cycle Test Results (Cycle # = 100)

| Sample No | Initial Capacity (mAh/g) | Capacity after Cycling (mAh/g) | Capacity Retention after Cycling (%) |
|---|---|---|---|
| Comparative 4 | 124 | 119 | 96 |
| 7 | 94 | 88 | 93 |
| 8 | 97 | 93 | 95 |

Example 6

The density of PVDF is around 1.5 times as TPU, i.e., 1.77 g/cm$^3$ vs. 1.1 g/cm$^3$, and the volume swelling of TPU in electrolyte is much higher than PVDF, i.e., >50% vs. 7%. Thus, replacement of PVDF with the same weight of TPU will result in more than 2 times binder volume in the electrodes. Thus, less TPU binder is required to bind the active particles together. In Example 6, PVDF binder is replaced with TPU material at half the weight and the ratio of active powder (MCMB for anode and $LiFePO_4$ for cathode) and carbon black (Super P® Li) is kept constant. The electrode formulations are indicated in Table 6.

TABLE 6

Cathode and Anode Formulations for Example 6

| Electrode | Sample No | MCMB (%) | LiFePO$_4$ (%) | Sample 1 (%) | Sample 2 (%) | Super P ® Li (%) |
|---|---|---|---|---|---|---|
| Anode | 9 | 89.72 | — | 5.00 | — | 5.28 |
| Anode | 10 | 89.72 | — | — | 5.00 | 5.28 |
| Cathode | 11 | — | 89.72 | 5.00 | — | 5.28 |
| Cathode | 12 | — | 89.72 | — | 5.00 | 5.28 |

Example 7

Anode and cathode samples in Example 6 are assembled into coin cells and evaluated by charge/discharge cycling test. The test results are shown in Table 7.

TABLE 7

Battery Charge/Discharge Cycle Test Results of Example 7

| Sample No | Anode | Cathode | Initial Capacity (mAh/g) | Capacity after cycling (mAh/g) | Capacity retention after cycling (%) |
|---|---|---|---|---|---|
| 13 | Comparative 2 | Sample 11 | 119 | 114 | 96 |
| 14 | Sample 9 | Sample 11 | 119 | 114 | 96 |
| 15 | Sample 10 | Sample 12 | 119 | 114 | 96 |

The battery testing results show that the inventive Samples 13-15 using TPU binder with 50% reduced loading in electrodes have comparable capacity and capacity retention as Comparative Sample 4 with benchmark PVDF binder.

Example 8

Still further examples are prepared to demonstrate the suitability of the TPU compositions of the invention for electrochemical cell applications, including Li-ion batteries. The following TPU compositions are prepared and tested to measure their hardness, their Li-ion conductivity, and their swelling properties. The formulations and results of these additional samples are summarized in the table below.

TABLE 8

Chemical Compositions for Example 8

| Sample No | Polyol | Chain Extender |
|---|---|---|
| 16 | 3000 MW poly(diethylene glycol adipate) | EDO |
| 17 | 3000 MW poly(diethylene glycol adipate) | CHDM |
| 18 | 2000 MW polyneopentyl adipate | EDO |
| 19 | 2000 MW poly(ethylene glycol adipate) | EDO |
| 20 | 1000 MW poly(ethylene glycol/diethylene glycol adipate) | EDO |
| 21 | 1000 MW poly(ethylene glycol/diethylene glycol adipate) | CHDM |

Samples are extruded into thin films with thickness of 1.0 mil or less by melt cast process for evaluation, including mechanical properties, Li ion conductivity, and swelling when exposed to common electrolyte systems.

TABLE 9

Results for Example 8

| Sample No | Hardness[1] | Li Ion Conductivity (mS/cm) | Swelling[3] Radial (%) | Radial (%) |
|---|---|---|---|---|
| 16 | 87A | 1.24 | 19 | 9 |
| 17 | 84A | Dissolved[4] | — | — |
| 18 | 87A | 0.78 | 34 | 18 |
| 19 | 88A | 1.06 | 48 | 23 |
| 20 | 91A | 1.39 | 54 | 25 |
| 21 | 84A | Dissolved[4] | — | — |

[1]Hardness is presented in a Shore A units, as measured by ASTM D-2240.
[2]Li ion conductivity is present in mS/cm. The values in the table above are averages of three separate test results. Results were obtained by dipping the dried membrane (stored at 80° C. in the vacuum oven for 24 hr) to be tested into a liquid electrolyte (1.2M LiPF$_6$ in a 30:70 blend of ethylene carbonate:ethyl methyl carbonate) for 12 hours, then removing the membrane, wiping the both surfaces with filter paper to remove excess liquid electrolyte, placing the membrane sandwiched between two stainless steel electrodes, and then measuring by electrochemical impedance spectroscopy using Solartron 1470E Multistat (London Scientific, Canada). The frequency was set from 0.1 MHz to 10 Hz with 10 mV amplitude.
[3]Swelling is evaluated using a liquid electrolyte (1.2M LiPF$_6$ in a 30:70 blend of ethylene carbonate:ethylmethyl carbonate). The dimension of film samples was measured by caliper before and after soaking in the liquid electrolyte for 12 hour. The axial swell (%) = (thickness after soaking − thickness before soaking)/thickness before soaking × 100%. The radial swell (%) = (radius after soaking − radius before soaking)/radius before soaking × 100%.
[4]Samples 18 and 22 dissolved in the electrolyte system and so no swelling measurements could be completed.

The results show that the TPU compositions of the invention, specifically samples 16, 18, 19, and 20, are well suited for use in electrochemical cell applications, including Li-ion batteries, and sample 16 is very well suited, having a very good combination of physical properties, electrolyte compatibility, and conductivity compared to other TPU compositions.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, all percent values, ppm values and parts values are on a weight basis. Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration while the expression "essentially free of" permits the exclusion of substances at least to a level that does not materially affect the basic and novel characteristics of the composition under consideration.

We claim:

1. An electrode binder composition comprising a poly(dialkylene ester) thermoplastic polyurethane composition and optionally further comprising a conducting agent.

2. The electrode binder composition of claim 1 wherein the conducting agent comprises carbon black, nickel powder, or a combination thereof.

3. The electrode binder composition of claim 1 wherein said poly(dialkylene ester) thermoplastic polyurethane composition is made by reacting (i) at least one poly(dialkylene ester)polyol intermediate with (ii) at least one diisocyanate and (iii) at least one chain extender;
   wherein (i), the poly(dialkylene ester)polyol intermediate, comprises an intermediate derived from at least one dialkylene glycol and at least one di-carboxylic acid, or an ester or anhydride thereof.

4. The electrode binder composition of claim 3 wherein (ii), the diisocyanate, comprises: 4,4'-methylenebis-(phenyl isocyanate); hexamethylene diisocyanate; 3,3'-dimethylbiphenyl-4,4'-diisocyanate; m-xylylene diisocyanate; phenylene-1,4-diisocyanate; naphthalene-1,5-diisocyanate; diphenylmethane-3,3'-dimethoxy-4,4'-diisocyanate; toluene diisocyanate; isophorone diisocyanate; 1,4-cyclohexyl diisocyanate; decane-1,10-diisocyanate; dicyclohexylmethane-4,4'-diisocyanate; or combinations thereof;
   wherein (iii), the chain extender, comprises: hydroquinone bis(beta-hydroxyethyl)ether; ethylene glycol; diethylene glycol; propylene glycol; dipropylene glycol; 1,4-butanediol; 1,6-hexanediol; 1,3-butanediol; 1,5-pentanediol; neopentylglycol; or combinations thereof; and
   wherein the di-carboxylic acid contains from 4 to 15 carbon atoms and the dialkylene glycol contains from 2 to 8 aliphatic carbon atoms.

5. The electrode binder composition of claim 3: (i), the poly(dialkylene ester)polyol intermediate, comprises poly (diethylene glycol adipate); (ii), the diisocyanate, comprises 4,4'-methylenebis-(phenyl isocyanate); and (iii), the chain extender, comprises butanediol, benzene glycol, or combinations thereof.

6. The electrode binder composition of any of claim 1 further comprising at least one additional additive, comprising a plasticizer, a lubricant, an antioxidant, a heat stabilizer, hydrolytic stabilizer, an acid scavenger, mineral and/or inert filler, a nano filler, or any combination thereof.

7. An electrochemical cell electrode comprising: (A) an electrode binder composition comprising a poly(dialkylene ester) thermoplastic polyurethane composition, and (B) an electrode active material, and wherein the electrode optionally further comprises a conducting agent.

8. The electrochemical cell electrode of claim 7 wherein the conducting agent comprises carbon black, nickel powder, or a combination thereof.

9. The electrochemical cell electrode of claim 7 wherein said poly(dialkylene ester) thermoplastic polyurethane composition is made by reacting (i) at least one poly(dialkylene ester)polyol intermediate with (ii) at least one diisocyanate and (iii) at least one chain extender;
wherein (i), the poly(dialkylene ester)polyol intermediate, comprises an intermediate derived from at least one dialkylene glycol and at least one di-carboxylic acid, or an ester or anhydride thereof.

10. The electrode of claim 9 wherein (ii), the diisocyanate, comprises: 4,4'-methylenebis-(phenyl isocyanate); hexamethylene diisocyanate; 3,3'-dimethylbiphenyl-4,4'-diisocyanate; m-xylylene diisocyanate; phenylene-1,4-diisocyanate; naphthalene-1,5-diisocyanate; diphenylmethane-3,3'-dimethoxy-4,4'-diisocyanate; toluene diisocyanate; isophorone diisocyanate; 1,4-cyclohexyl diisocyanate; decane-1,10-diisocyanate; dicyclohexylmethane-4,4'-diisocyanate; or combinations thereof;
wherein (iii), the chain extender, comprises: hydroquinone bis(beta-hydroxyethyl)ether; ethylene glycol; diethylene glycol; propylene glycol; dipropylene glycol; 1,4-butanediol; 1,6-hexanediol; 1,3-butanediol; 1,5-pentanediol; neopentylglycol; or combinations thereof; and
wherein the di-carboxylic acid contains from 4 to 15 carbon atoms and the dialkylene glycol contains from 2 to 8 aliphatic carbon atoms.

11. The electrode of claim 7 wherein (B), the electrode active material, is a cathode active material selected from the group consisting of: lithium composite oxides; elemental sulfur; casolite containing dissolved $Li_2S_n$ where n is greater than or equal to 1; organosulfur; $(C_2S_x)_y$ where x is from 2.5 to 20 and y is greater than or equal to 2; and a combination thereof.

12. The electrode of claim 7 wherein (B), the electrode active material, is an anode active material selected from the group consisting of: a graphite-based material; a first compound containing at least one of Al, Si, Sn, Ag, Bi, Mg, Zn, In, Ge, Pb, and Ti; a composite of the first compound, the graphite-based material, and carbon; a lithium-containing nitride; and a combination thereof.

13. The electrode of claim 7 wherein the amount of the electrode active material is in the range of 80-99% by weight with respect to the total electrode weight.

14. The electrode of claim 7 wherein the electrode is a sheet-type electrode for a lithium battery.

15. The electrode of claim 7 further comprising at least one additional additive, comprising a plasticizer, a lubricant, an antioxidant, a heat stabilizer, hydrolytic stabilizer, an acid scavenger, mineral and/or inert filler, a nano filler, or any combination thereof.

16. An electrochemical cell comprising at least one electrode where the electrode comprises: (A) an electrode binder composition comprising a poly(dialkylene ester) thermoplastic polyurethane composition, and (B) an electrode active material, and wherein the electrode optionally further comprises a conducting agent.

17. The electrochemical cell of claim 16 further comprising:
a separator membrane disposed between said positive and negative electrodes, wherein the said membrane comprises a poly(dialkylene ester) thermoplastic polyurethane composition and an electrochemically active electrolyte species;
wherein said poly(dialkylene ester) thermoplastic polyurethane composition is made by reacting (i) at least one poly(dialkylene ester)polyol intermediate with (ii) at least one diisocyanate and (iii) at least one chain extender, wherein (i), the poly(dialkylene ester)polyol intermediate, comprises an intermediate derived from at least one dialkylene glycol and at least one di-carboxylic acid, or an ester or anhydride thereof.

18. The electrochemical cell of claim 16 further comprising at least one additional additive, comprising a plasticizer, a lubricant, an antioxidant, a heat stabilizer, hydrolytic stabilizer, an acid scavenger, mineral and/or inert filler, a nano filler, or any combination thereof.

19. The electrochemical cell of claim 16 further comprising:
a polymer gel electrolyte disposed between said positive and negative electrodes, wherein the polymer electrolyte comprises a poly(dialkylene ester) thermoplastic polyurethane composition, an alkali metal salt, and an aprotic organic solvent, wherein said poly(dialkylene ester) thermoplastic polyurethane composition is made by reacting (i) at least one poly(dialkylene ester)polyol intermediate with (ii) at least one diisocyanate and (iii) at least one chain extender, wherein (i), the poly(dialkylene ester)polyol intermediate, comprises an intermediate derived from at least one dialkylene glycol and at least one di-carboxylic acid, or an ester or anhydride thereof.

* * * * *